(12) United States Patent  
Knoller

(10) Patent No.: US 6,588,519 B2  
(45) Date of Patent: Jul. 8, 2003

(54) HEAD FOR A ROCK DRILL

(75) Inventor: Anton Knoller, Landsberg (DE)

(73) Assignee: Hilti Aktiengesellschaft, Liechtenstein ( * ) Notice: Subject to any disclaimer, the term of this patent is extended or adjusted under 35 U.S.C. 154(b) by 0 days.

(21) Appl. No.: 10/032,670

(22) Filed: Oct. 25, 2001

(65) Prior Publication Data

US 2002/0053473 A1 May 9, 2002

(51) Int. Cl.$^7$ .............................................. E21B 10/36
(52) U.S. Cl. .................... 175/420.1; 175/415; 175/420; 175/426; 408/224
(58) Field of Search ................................ 175/415, 420, 175/412, 420.1, 426, 389; 408/224

(56) References Cited

U.S. PATENT DOCUMENTS

| | | | | |
|---|---|---|---|---|
| 748,890 A | * | 1/1904 | Taylor et al. ............... | 408/224 |
| 5,220,967 A | * | 6/1993 | Monyak ................... | 175/420.1 |
| 5,492,187 A | * | 2/1996 | Neukirchen et al. ........ | 175/394 |
| 5,779,403 A | * | 7/1998 | Kleine et al. ............... | 408/230 |
| 5,836,410 A | * | 11/1998 | Kleine ........................ | 175/415 |
| 6,116,361 A | * | 9/2000 | Kleine et al. ............... | 175/415 |
| 6,260,638 B1 | * | 7/2001 | Massa et al. ............... | 175/427 |
| 6,283,232 B1 | * | 9/2001 | Batliner et al. ............. | 175/415 |
| 6,374,931 B1 | * | 4/2002 | Nieves ..................... | 175/420.1 |
| 6,405,813 B1 | * | 6/2002 | Kleine et al. ............. | 175/420.1 |
| 6,431,295 B1 | * | 8/2002 | Kleine et al. ............... | 175/415 |
| 6,450,273 B1 | * | 9/2002 | Kleine et al. ............. | 175/420.1 |

\* cited by examiner

*Primary Examiner*—David Bagnell  
*Assistant Examiner*—Shane Bomar  
(74) *Attorney, Agent, or Firm*—Sidley Austin Brown & Wood, LLP

(57) ABSTRACT

A rock drill head including a radially extending groove (2*a*) formed in a head body, a recess (5) formed inside the groove (2*a*); and at least two, substantially plate-shaped, hard-material inserts located in the groove (2*a*) and having each a radially extending, segment (4*a*, 4*b*) engaging in the recess (5).

9 Claims, 2 Drawing Sheets

HEAD FOR A ROCK DRILL

BACKGROUND OF THE INVENTION

1. Field of the Invention

The present invention relates to a head for a rock drill for an abrasive drilling of stone or stone-like materials and subjected to a rotary-percussion movement, with the head having at least one hard-material insert.

2. Description of the Prior Art

Conventional rock drills usually include a hard-material element in form of a hard-material plate or a head which is formed entirely of a hard material. The hard-material plate is secured in a tool head which adjoins a stem of the tool that is often provided with a helically shaped passage. The stem ends with a shank receivable in a chuck of a drilling tool.

European Publication EP 937 860 A1 discloses a head with a plurality of hard-material inserts located in grooves, which are formed in the head, and forming three plate-shaped bits arranged above a central cylindrical rough-cutting bit.

German Publication DE 197 03 994 A1 discloses a rock drill with a one-piece main bit with two adjacent auxiliary bits which all are formed of three plate-shaped, hard-material inserts and are arranged in a shaped pattern.

German Publication DE 197 09 771 A1 discloses a head, which is formed entirely of a hard material and has two main cutting edges and two auxiliary cutting edges provided on the end surface of the head, with the head including axially engaging elements.

U.S. Pat. No. 5,836,410 discloses a plate-shaped main bit provided, in the region of the drill axis, on its opposite sides with a radial reinforcement forming a rough-cutting edge. The reinforcement has a circular cross-section, in a plane extending perpendicular to the head axis, and is arranged in a coaxial cylindrical recess formed in the head.

U.S. Pat. Nos. 5,220,967 and 4,603,751 disclose a head with a single plate-shaped, main bit arranged in a groove formed in the head. The bit has an axial projection that engages in a coaxial recess formed in the head and provides for radial self-centering of the bit during its securing.

An object of the present invention is a rock drill head with a plurality of hard-material, plate-shaped inserts which self-center upon being secured in the head.

SUMMARY OF THE INVENTION

This and other objects of the present invention, which will become apparent hereinafter, are achieved by providing a rock drill head including at least one radially extending groove, a recess formed inside the groove, and at least two, substantially plate-shaped, hard-material inserts located in the groove and having each a radially extending, segment engaging in the circular recess. Upon being secured in the radially extending groove, the hard-material inserts radially self-center, radially inwardly, due to cooperation of respective inner surfaces of the inserts and, radially outwardly, due to formlocking engagement of respective arcuate, e.g., circular or elliptical segments in the recess formed in the head. The projecting radially outwardly, arcuate segments complement the thicknesses of the plate-shaped inserts, forming a circumferentially complete body that formlockingly fills the recess in which they are engaged.

Advantageously, the central cutting tip is formed either as an integral component of one of the inserts or is formed as a separate, compact rough-cutting insert or bit.

It is to be pointed out that providing a head having a plurality of plate-shaped, hard-material inserts instead of a head formed completely of a hard material, provides definite manufacturing advantages consisting in simplified manufacturing of the head and in the possibility of using different inserts.

Further, a greater tolerance is available with respect to the angular arrangement of the cutting edges relative to the radially extending grooves in the head in comparison with the arrangement of single cutting edge-forming legs provided in the hard-material head and inclined because of the distortion due to sintering. The inclination of the cutting edge-forming legs requires that the legs have a sufficient thickness. Thereby, the inserts according to the present invention can have a reduced thickness.

The reduced thickness of the inserts permits to increase the cross-section available for removal of the drilling dust and drillings, which increases the drilling capacity of the drill equipped with a head according to the present invention.

According to a first embodiment of the present invention, two, three or more substantially plate-shaped, hard-material inserts are arranged diametrically or in form of a star about a central cutting tip or rough-cutting edge, with the rough-cutting edge forming an integral component of one of the inserts.

According to another advantageous embodiment of the present invention, one insert forms two, diametrically opposite, main cutting edges on opposite sides of a rough-cutting edge, with the head further including two auxiliary cutting edges forming together with the two main cutting edges a shaped arrangement of the cutting edges.

Advantageously, separate inserts are formed of different hard materials in accordance with a load acting on the separate inserts. E.g., with an shaped arrangement, the main cutting edge-forming insert is formed of a particularly hard material such as ceramics in order to be able to drill a stone material without any noticeable wear, whereas the auxiliary cutting edge-forming insert is formed of a sufficiently hard but not very hard material such as, e.g., hard metal. The auxiliary cutting edge should not break when encountering a reinforcement, and is adjoined by a run-on ramp to provide for lifting of the drill head before the contact of the main cutting edge with the reinforcement.

No additional means are necessary, such as used for retaining dowels, when securing separate hard-material inserts in the radially extending grooves and the recess, as the inserts are formlockingly retained there.

The novel features of the present invention, which are considered as characteristic for the invention, are set forth in the appended claims. The invention itself, however, both as to is construction and its mode of operation, together with additional advantage and objects thereof, will be best understood from the following detailed description of preferred embodiments, when read with reference to the accompanying drawings.

DETAILED DESCRIPTION OF THE PREFERRED EMBODIMENTS

Figure 1:
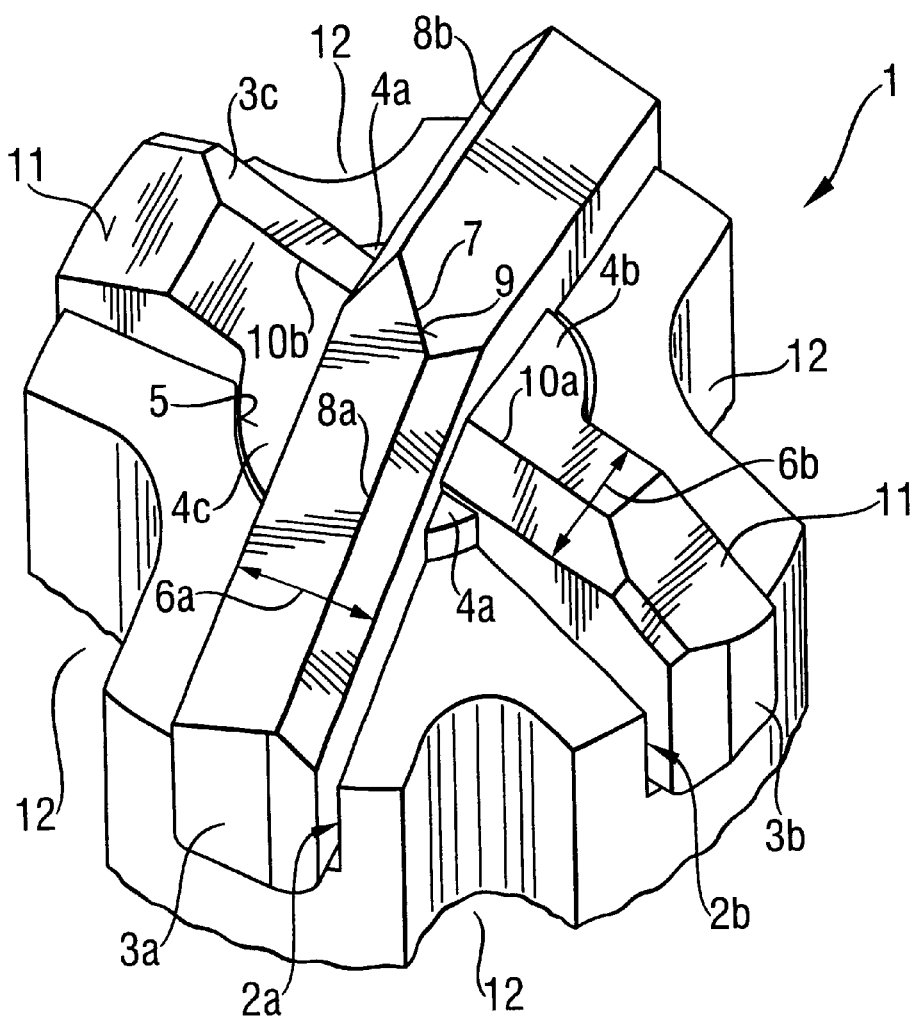
FIG. 1 a perspective view of a first embodiment of a rock drill head according to the present invention.

A head 1 of a rock drill, which is shown in FIG. 1, has three substantially plate-shaped inserts 3a, 3b, 3c formed of a hard material and located in radially extending grooves 2a and 2b formed in the head 1. The inserts 3a, 3b, 3c include, respectively, radially extending arcuate segments 4a, 4b, 4c formed as segments of a circular cylinder. The three arcuate segments 4a, 4b, 4c are located in a common, cylindrical recess 5 formed in the head 1 coaxially therewith. The segments 4a, 4b, 4c are radially formlockingly secured in the recess 5. The projecting radially outwardly segments 4a, 4b, 4c, which are provided on the plate-shaped inserts 3a, 3b, 3c, are complemented by plate thicknesses 6a, 6b to a complete cylinder that occupies the entire recess 5. The central cutting tip 7 is formed as an integral component of one of the inserts, namely, the insert 3a. The thickness 6a, 6b is rather small. The substantially plate-shaped, hard-material insert 3a is formed of ceramics and has two, diametrically opposite, main cutting edges 8a, 8b which are connected by a central rough-cutting edge 9. The two other inserts 3b and 3c are formed of hard metal. The inserts 3b, 3c form auxiliary cutting edges 10a, 10b, respectively, which are adjoined by respective run-on ramps 11 inclined in a rotational direction. The four cutting edges 8a, 8b, 10a, 10b form an shape arrangement and are associated with respective axial grooves 12.

Figure 2:
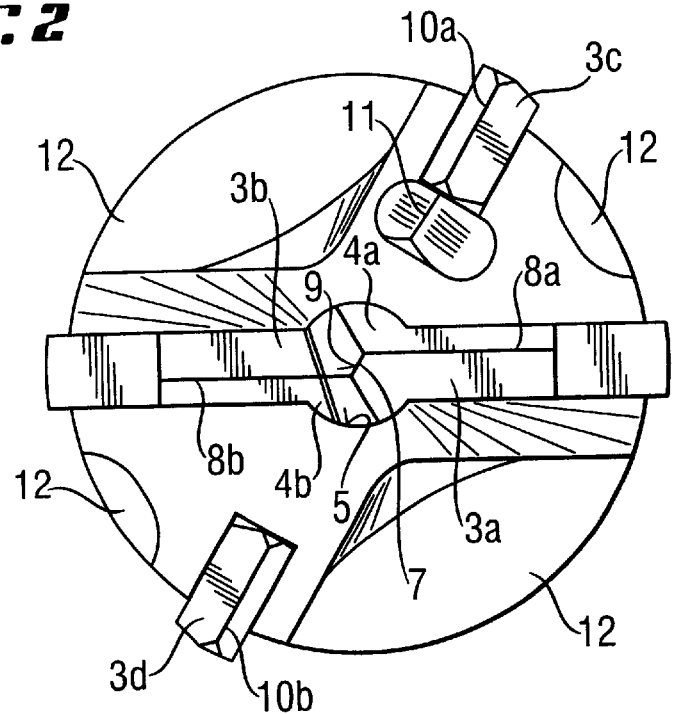
FIG. 2 a perspective view of a second embodiment of a rock drill head according to the present invention.

FIG. 2 shows a head with two substantially plate-shaped, hard-material inserts 3a, 3b with projecting radially outwardly segments 4a, 4b. The inserts 3a, 3b form main cutting edges 8a, 8b respectively, which are arranged diametrically opposite each other. The central cutting tip 7 forms an integral component of the inset 3a. The head 1 further includes two further substantially plate-shaped, hard-material inserts 3c, 3d which form, respectively, auxiliary cutting edges 10a, 10b. The inserts 3c, 3d are separated from inserts 3a, 3b and are provided at a radially outer edge of the head.

Figure 3:
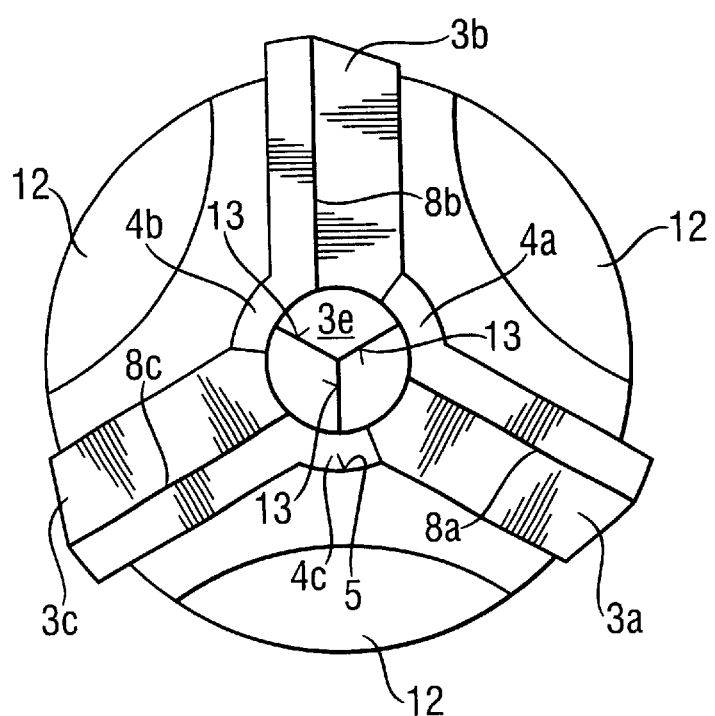
FIG. 3 a perspective view of a third embodiment of a rock drill head according to the present invention.

The head, which is shown in FIG. 3 also includes three, substantially plate-shaped, hard material inserts 3a, 3b, 3c with respective, projecting radially outwardly segments 4a, 4b, 4c and with respective main cutting edges 8a, 8b, 8c arranged about a central rough-cutting edge 13 that is formed as a compact hard-material insert 3e.

Though the present invention was shown and described with references to the preferred embodiments, such are merely illustrative of the present invention and are not to be construed as a limitation thereof, and various modifications to the present invention will be apparent to those skilled in the art. It is, therefore, not intended that the present invention be limited to the disclosed embodiments or details thereof, and the present invention includes all of variations and/or alternative embodiments within the spirit and scope of the present invention as defined by the appended claims.

What is claims is:

1. A rock drill head, comprising a radially extending groove (2a) formed in a head body; a recess (5) formed inside the groove (2a); and at least two, substantially plate-shaped, hard-material inserts (3a, 3b) located in the groove (2a) and having each a radially extending segment (4a, 4b) engaging in the recess (5), wherein plate thickness (6a, 6b) of the at least two inserts (3a, 3b) complement the segments (4a, 4b) so that a circumferentially complete body is formed.

2. A rock drill head, comprising a radially extending groove (2a) formed in a head body; a recess (5) formed inside the groove (2a); at least two, substantially plate-shaped, hard-material inserts (3a, 3b) located in the groove (2a) and having each a radially extending segment (4a, 4b) engaging in the recess (5); and a central cutting tip (7) formed as an integral component of one of the at least two inserts (3a, 3b).

3. A rock drill head, comprising a radially extending groove (2a) formed in a head body; a recess (5) formed inside the groove (2a); and at least two, substantially plate-shaped, hard-material inserts (3a, 3b) located in the groove (2a) and having each a radially extending segment (4a, 4b) engaging in the recess (5), wherein the at least two inserts (3a, 3b) form respective main cuffing edges (8a, 8b) arranged at a same angular distance about one of a central cutting tip (7) and a rough-cutting edge (13).

4. A rock drill head according to claim 3, the rough-cutting edge (13) forms an integral component of one of the inserts (3a).

5. A rock drill head, comprising a radially extending groove (2a) formed in a head body; a recess (5) formed inside the groove (2a); and at least two, substantially plate-shaped, hard-material inserts (3a, 3b) located in the groove (2a) and having each a radially extending segment (4a, 4b) engaging in the recess (5), wherein one of the inserts (3a) forms two, diametrically opposite, main cutting edges (8a, 8b) on opposite sides of a rough-cutting edge (9), and wherein the head further includes two auxiliary cuffing edges (10a, 10b) forming together with the two main cutting edges (8a, 8b) X-shaped arrangement of the cutting edges.

6. A rock drill head, comprising a radially extending groove (2a) formed in a head body; a recess (5) formed inside the groove (2a); and at least two, substantially plate-shaped, hard-material inserts (3a, 3b) located in the groove (2a) and having each a radially extending segment (4a, 4b) engaging in the recess (5), wherein the at least two inserts (3a, 3b) are formed of different materials in accordance with a load acting thereon.

7. A rock drill head, comprising a radially extending groove (2a) formed in a head body; a recess (5) formed inside the groove (2a); and at least two, substantially plate-shaped, hard material inserts (3a, 3b) located in the groove (2a) and having each a radially extending segment (4a, 4b) engaging in the recess (5), and a central cutting tip (7) formed as a separate hard-material insert (3e).

8. A rock drill head, comprising radially extending groove (2a) formed in a head body; a recess (5) formed inside the groove (2a); and at least two, substantially plate-shaped, hard material inserts (3a, 3b) located in the groove (2a) and having each a radially extending segment (4a, 4b) formed integrally with a respective insert (3a, 3b) and both engaging in the recess (5) common for both segments.

9. A rock drill head according to claim 8, wherein the at least two inserts (3a, 3b) are self-centered in the groove (2a) and are secured, radially inwardly, due to cooperation of respective inner surfaces thereof and are secured, radially outwardly, due to a formlocking engagement of the respective segments (4a, 4b) in the recess (5).

* * * * *

UNITED STATES PATENT AND TRADEMARK OFFICE
CERTIFICATE OF CORRECTION

PATENT NO. : 6,588,519 B2
DATED : July 8, 2003
INVENTOR(S) : Anton Knoller

It is certified that error appears in the above-identified patent and that said Letters Patent is hereby corrected as shown below:

<u>Title page,</u>
Item [30], insert:

-- Foreign Application Priority Data

October 27, 2000     (DE)…………………….. 100 53 344.2 --

Signed and Sealed this

Thirteenth Day of April, 2004

JON W. DUDAS
*Acting Director of the United States Patent and Trademark Office*